No. 738,363. PATENTED SEPT. 8, 1903.
W. J. SHELTON.
HOLDER FOR POISON.
APPLICATION FILED APR. 22, 1903.

NO MODEL.

William J. Shelton, Inventor,

By E. G. Siggers

Attorney

Witnesses
Howard D. Orr
B. G. Foster

No. 738,363.

Patented September 8, 1903.

UNITED STATES PATENT OFFICE.

WILLIAM J. SHELTON, OF VAN VLECK, TEXAS, ASSIGNOR OF ONE-HALF TO CHARLES M. BROWNING, OF VAN VLECK, TEXAS.

HOLDER FOR POISON.

SPECIFICATION forming part of Letters Patent No. 738,363, dated September 8, 1903.

Application filed April 22, 1903. Serial No. 153,848. (No model.)

*To all whom it may concern:*

Be it known that I, WILLIAM J. SHELTON, a citizen of the United States, residing at Van Vleck, in the county of Matagorda and State of Texas, have invented a new and useful Holder for Poison, of which the following is a specification.

This invention relates to means for holding poison when distributed for use.

In poisoning insects and small rodents of various kinds it is the general custom to distribute the poison loosely in places frequented by said insects or animals. Care is therefore necessary to prevent pets and other animals for which the poison is not intended from gaining access to the same. Furthermore, considerable difficulty is experienced in keeping trace of the poison, especially where it is distributed generally and in considerable quantities, and if some is lost it may in time become exposed, thus endangering the lives of animals which it was not contemplated should be exterminated. Moreover, there is considerable waste in the common manner of distributing poison, for after it has been collected it cannot be conveniently kept for further use and is ordinarily thrown away.

It is the object of the present invention to provide a very simple device which constitutes a holder for poison, permitting free access of insects or even small rodents to the same and acting as a protector to larger animals. Thus this device can be freely distributed without accidental disastrous result. Furthermore, the poison is not wasted. The holders may be collected and the poison contained therein thereby saved for future use.

Figure 1:
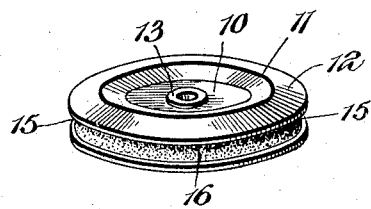
Figure 2:
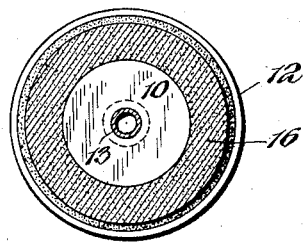
Figure 3:
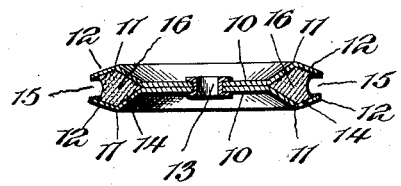

In the drawings accompanying this specification, Figure 1 is a perspective view of the holder. Fig. 2 is a horizontal sectional view through the same. Fig. 3 is a vertical sectional view.

Similar reference-numerals indicate corresponding parts in all the figures of the drawings.

In the embodiment illustrated two walls are employed, which are preferably in the form of duplicate disks having sunken or depressed central portions 10 and outstanding annular portions 11, that surround the intermediate portions 10. The outstanding portions 11 have their peripheries slightly inturned, as shown at 12. The two disks are arranged with their depressed walls 10 flat against each other and are secured by a rivet 13, passing therethrough. As a result an annular poison-receiving pocket 14 is formed, and the peripheral walls thereof converge to provide a contracted mouth 15. In this pocket is placed the poison, (shown at 16.)

It will be observed that this device may be placed promiscuously about and insects will have free access to the poison through the contracted mouth, a comparatively great area of said poison being exposed. On the other hand, a large animal will be unable to reach the poison, and the device thus constitutes a protector for the same in such case. A comparatively great body of poison can be placed in the pocket and is securely held against falling therefrom by the convergent walls. The holders can be collected when the poison is not wanted for use, and said poison will of course be kept therein, being thus preserved for future use without inconvenience. A further advantage resides in the fact that the structure can be manufactured at extremely small cost, the walls being duplicates and held together by a small rivet.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. A holder of the class described comprising separate plates having intermediate portions of their adjacent faces arranged against each other and their margins spaced apart to form an annular poison-receiving pocket having an outer open mouth, and means for securing the intermediate abutted portions of the faces together.

2. A holder of the class described, comprising disk walls having sunken intermediate portions resting against each other and secured together, the peripheral portions of said walls being spaced apart to form an annular open-mouthed poison-receiving pocket.

3. A holder of the class described, comprising disk-shaped walls having sunken intermediate portions resting against each other, a rivet passing through the intermediate portions and securing them together, the peripheral portions of said walls being spaced apart and converging toward their edges to form an annular poison-receiving pocket having a contracted mouth.

In testimony that I claim the foregoing as my own I have hereto affixed my signature in the presence of two witnesses.

WILLIAM J. SHELTON.

Witnesses:
W. M. SHOWALTER,
JNO. W. GAINES, Jr.